United States Patent [19]

Weiler et al.

[11] Patent Number: 4,567,812
[45] Date of Patent: Feb. 4, 1986

[54] BRAKE BOOSTERS FOR AUTOMOTIVE VEHICLES

[75] Inventors: Rolf Weiler, Sindlingen; Reimund Becht, Frankfurt-Hoechst; Peter Boehm, Frankfurt am Main, all of Fed. Rep. of Germany

[73] Assignee: ITT Industries, Inc., New York, N.Y.

[21] Appl. No.: 679,616

[22] Filed: Dec. 10, 1984

Related U.S. Application Data

[63] Continuation of Ser. No. 221,584, Dec. 31, 1980, abandoned.

[51] Int. Cl.[4] .............................................. F15B 9/10
[52] U.S. Cl. ................... 91/369 A; 91/376 R; 92/98 D; 92/169; 403/349
[58] Field of Search ............ 91/369 A, 369 B, 369 R, 91/376 R; 60/547.1, 563; 92/169.4, 169.3, 169.2, 98 D; 403/348, 349

[56] References Cited

U.S. PATENT DOCUMENTS

| 363,122 | 5/1887 | Dimick | 403/348 |
| 4,307,570 | 12/1981 | Yardley | 60/547 R |
| 4,338,854 | 7/1982 | Margetts | 91/369 A |

FOREIGN PATENT DOCUMENTS

| 2922299 | 12/1979 | Fed. Rep. of Germany ... | 91/369 A |
| 2031086 | 4/1980 | United Kingdom | 60/563 |
| 2040376 | 8/1980 | United Kingdom | 91/369 A |
| 2053395 | 2/1981 | United Kingdom | 91/369 A |

Primary Examiner—Paul E. Maslousky
Attorney, Agent, or Firm—James B. Raden; Donald J. Breh

[57] ABSTRACT

Differential pressure brake boosters are known having a reinforcement tube extending axially through the low-pressure casing with its ends fastened to both end surfaces of the casing. A mechanically actuated control valve for connecting the working chamber to the low-pressure chamber or to atmosphere is axially movable in the reinforcement tube. A sleeve surrounding a master cylinder piston push rod has radial ribs extending through longitudinal slots of the reinforcement tube to connect the push rod to the movable wall. These ribs are subjected to a high bending stress. According to the present invention the radial ribs are constructed as flat tongues disposed in a common plane, the tongues being engaged on a side thereof adjacent the low-pressure chamber by an outwardly angled collar of an extension of the housing of the control valve. The distance between the rolling diaphragm of the movable wall adjacent the reinforcement tube and the end of the longitudinal slots adjacent the work chamber is at least equal to half the power stroke of the axially movable wall.

7 Claims, 4 Drawing Figures

BRAKE BOOSTERS FOR AUTOMOTIVE VEHICLES

This is a continuation of application Ser. No. 221,584, filed Dec. 31, 1980, now abandoned.

BACKGROUND OF THE INVENTION

The present invention relates to a brake booster for automotive vehicles comprising a low-pressure casing sealingly subdivided into a low-pressure chamber and a working chamber by an axially movable wall; a reinforcement tube extending axially through the low-pressure casing having its ends fastened to the two end walls of the low-pressure casing and a rolling diaphragm in sealing abutment relative to the movable wall; a mechanically actuatable control valve for connecting the working chamber to the low-pressure chamber or to atmosphere, the control valve housing axially movable in the reinforcement tube is connected via a push rod with an actuating piston of a master cylinder, secured to the low-pressure casing on the side close to the partial vacuum, and via a sleeve encompassing the push rod is connected to radial ribs of the movable wall, the radial ribs projecting through longitudinal slots of the reinforcement tube.

When a brake booster is conventionally arranged between the automotive vehicle's splashboard and the master cylinder of the brake unit, a considerable amount of force has to be transmitted from the master cylinder to the splashboard through the brake booster casing upon actuation of the brake. To relieve the low-pressure casing from this force and to render possible a construction of the low-pressure casing of lighter weight, it is known for German Patent Application DE-OS No. 2,845,794 to arrange tensilely loaded construction elements in the form of tie rods between the two end walls of the low-pressure casing and thus between the master cylinder and the splashboard. The tie rods extend through the axially movable wall of the brake booster, and a seal is required at this point causing a relatively high constructional expenditure and a certain failure tendency.

A brake booster is described in the U.S. copending application of J. Belart and F. Weinecke, Ser. No. 061,113, filed July 26, 1979, assigned to the same asignee as the present application, in which the tie element interconnecting the two end walls of the low-pressure casing is formed by a reinforcement tube. Since the control valve housing is incorporated within the reinforcement tube and since the axially movable wall is required to be urged into a force-transmitting engagement with the control housing, connecting members have to be guided from the movable wall outside the reinforcement tube, through slots or recesses in the reinforcement tube to link with the control valve housing.

The slots or recesses are included in the area of the working chamber in the brake booster in the above-cited copending application. The axially movable wall is sealingly guided on the reinforcement tube in the area adjacent to the slots or recesses on the side close to the partial vacuum. The length of this sealing guide corresponds inevitably to the power stroke of the axially movable wall. Since the length of the slots or recesses is likewise determined by the power stroke, the length of the reinforcement tube has to be greater than double the power stroke of the movable wall resulting in a comparatively large overall length of the brake booster.

A reduced overall length of the brake booster may be accomplished by having the seal disposed between the movable wall and the reinforcement tube constructed as a rolling diaphragm abutting the reinforcement tube in a rolling manner, with the front surface of the rolling diaphragm moving axially a distance which is but half as long as the power stroke of the movable wall as disclosed, for example, in U.S. copending application of R. Becht-P. Bohm, Ser. No. 142,298, filed Apr. 12, 1908, assigned to the same assignee as the present invention. To provide an overall length of the brake booster as small as possible, the rolling diaphragm will roll out extending over the slots in the reinforcement tube.

In order to keep the thereby occasioned additional demand upon the rolling diaphragm and the thereby caused wear as small as possible, it is desired to construct the slots as narrow as possible. Accordingly, the connecting members or the ribs extending through these slots have to be constructed as narrow as possible, also. On the other hand, however, the ribs are subjected to a considerable bending stress since they transmit the total amount of boosting force of the brake booster. However, an enlargement of the ribs' dimensions in the axial direction of the brake booster is barred by the enlargement of the brake booster's overall length which would be thereby brought about.

Because of the comparatively high amount of forces required to be transmitted by the ribs extending through the slots of the reinforcement tube, it is likewise difficult to connect the ribs to the control valve housing, since the connection point of the ribs with a sleeve fitted to the control valve housing is required to project beyond the ribs as little as possible in the axial direction towards the master cylinder to keep the overall length small.

SUMMARY OF THE INVENTION

It is, therefore, an object of the present invention to provide a brake booster of the type referred to hereinabove having a minimum possible overall length without the seal necessary between the movable wall and the reinforcement tube being impaired by the slots provided in the reinforcement tube. With this arrangement, it is possible to transmit a comparatively high amount of bending forces between the radial ribs and the control valve housing by simple constructive means, with the total weight of the brake booster being kept at the minimum possible amount.

A feature of the present invention is the provision of a brake booster for automotive vehicles comprising: a casing divided into a low-pressure chamber and a work chamber in a sealed manner by an axially movable wall; a reinforcement tube extending axially through the casing having its ends fastened to the two end walls of the casing; a rolling diaphragm in a sealed relationship with the movable wall and the tube; and a mechanically actuatable control valve for connecting the working chamber to a selected one of the low-pressure chamber and atmosphere, the control valve having a housing axially movable within the tube, the housing having one end of a sleeve connected and the other end of the sleeve connected to radial ribs of the movable wall, the ribs projecting through and slidable in longitudinal slots in the tube, the ribs being flat tongues disposed in a common plane transverse to a longitudinal axis of the casing, the tongues being engaged on a side thereof adjacent the low-pressure chamber by an outwardly angled collar on the other end of the sleeve, and the distance between the rolling diaphragm and the adjacent end of the longitudinal slots is at least equal to one half the power stroke of the movable wall.

Since the rolling diaphragm no longer rolls out over the longitudinal slots of the reinforcement tube, these longitudinal slots or recesses are allowed to be very wide. Thus, it is possible to also construct the radial ribs comparatively wide enabling these ribs to also transmit a great amount of bending forces — despite being of only a relatively small thickness. Since the tongues forming the radial ribs may be very wide, there is equally no difficulty in introducing the force into the sleeve connected to the control valve housing providing the possibility of choosing a connection with the sleeve which extends as little as possible beyond the radial ribs' plane in the axial direction, that is to say, of choosing an angled collar engaging behind the flat tongues on the side close to the partial vacuum. The latter connection therefore projects beyond the tongues forming the radial ribs by the thickness of the material forming the sleeve.

Suitably, the radial ribs are formed integrally with a diaphragm plate of sheet metal of the axially movable wall. This results in a very light-weight and, at the same time, inherently stable operation of the movable wall with the ribs extending into the reinforcement tube. Instead of this arrangement, the radial ribs may be formed on a separate spacer ring, which communicates with the diaphragm plate and may, in this case, be of thin-walled design without regard to the bending stress occurring in the ribs.

Improving upon the idea of the invention, there is provided at least one edge of indentations deformed radially outwardly from the sleeve abutting in each case on the radial inner rims of the radial ribs on the side close to the working chamber. Thus, the axial fixing of the ribs to the sleeve is achieved by very simple constructive means. However, the stress exerted on these deformed indentations is only comparatively small, because the boosting force is not transmitted via these indentations, but in the opposite direction via the angled collar of the sleeve.

It has proved to be particularly advantageous to divide the collar engaged behind the radial ribs into collar portions which correspond to the circumferential width of the radial ribs, with lateral collar portions angled toward the working chamber joining these collar portions. This fixes the radial ribs abutting the collar portions in the circumferential direction between the lateral collar portions. This obviates the need for a separate rotation-locking mechanism of the radial ribs at the sleeve.

In accordance with a useful embodiment of the present invention, there is provided, disposed between the collar portions engaging the radial rims from behind axially set-back sleeve rims having likewise radially outwardly angled collar portions interconnecting lateral collar portions. The axially set-back sleeve rims provide space for the screw joints necessary to fasten the end wall and the master cylinder to the reinforcement tube. But, at the same time, the inherent stability of the sleeve is increased by those collar portions that are not arranged at the connecting point with the radial ribs only.

The ease of assembly of the brake booster may still be improved by providing lateral insertion slots for the radial ribs in the lateral collar portions spaced from the collar portions engaging the radial ribs from behind and by ensuring that the circumferential distance of the adjacent lateral collar portions is greater than the circumferential extension of the radial rib. The sleeve may be assembled from the low-pressure side, with the ribs being inserted between the collar portions that are provided to connect with the ribs and with the ribs being inserted laterally through the insertion slots by a rotary motion. This connection, established in the way of a bayonet connection, will be further secured by the outwardly deformed indentations of the sleeve, so that no rotary motion and, consequently, no loosening will be allowed to occur subsequently.

Improving upon the idea of the invention, the radial ribs are situated in the bottom surface of a hub member extending axially from the diaphragm plate and a substantially cylindrical inset is fitted in the hub member in the area of the rolling diaphragm, so that the loss in the effective surface for the rolling diaphragm is kept as low as possible. For reasons of assembly, the hub member's inner diameter is predetermined by the reinforcement tube's overall dimensions in the area of the screw connection with the master cylinder.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
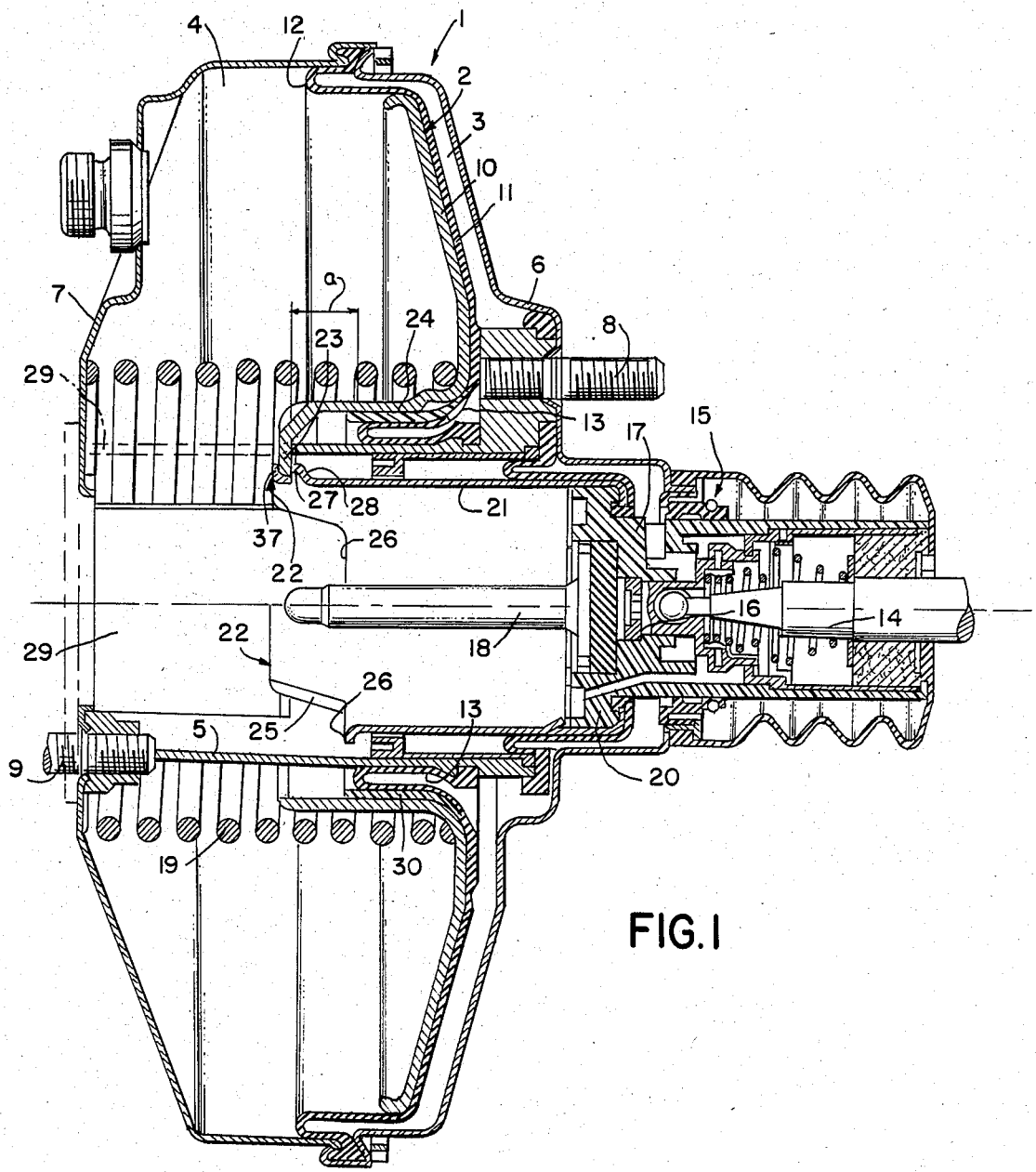
FIG. 1 is a longitudinal cross sectional view of a brake booster in accordance with the principles of the present invention.

The brake booster illustrated in FIG. 1 includes a low-pressure casing 1 which is divided into a working chamber 3 and a low-pressure chamber 4 by an axially movable wall 2. Extending axially through low-pressure casing 1 is a reinforcement tube 5 having its ends fastened to the two end walls 6 and 7 of the low-pressure casing 1 by means of the threaded bolts 8 and 9.

Axially movable wall 2 includes a diaphragm plate 10 and a diaphragm 11 which abuts plate 10 and is constructed as a rolling diaphragm 12 in the area between the outer periphery of the diaphragm plate 10 and the circumferential wall of low-pressure casing 1 and another rolling diaphragm 13 in the area between diaphragm plate 10 and reinforcement tube 5, by which rolling diaphragms movable wall 2 sealed relative to low-pressure casing 1 and reinforcement tube 5.

A control valve 15 actuated by a piston rod 14 is disposed at the end of reinforcement tube 5 close to working chamber 3 and has a control valve piston 16 connected to piston rod 14, which opens valve openings in a control valve housing 17 in such a manner that working chamber 3 is connected to low-pressure chamber 4 in the inactive position illustrated in FIG. 1. When control valve 15 is actuated, i.e. when piston rod 14 is axially displaced, the connection between low-pressure chamber 4 and working chamber 3 is interrupted, and working chamber 3 is connected to atmosphere so that movable wall 2 will move towards low-pressure chamber 4.

Connected to the axially movable valve housing 17 is a push rod 18 which acts on an actuating piston of a master cylinder (not illustrated) of the brake unit, the master cylinder being secured to the end of reinforcement tube 5 on the side close to chamber 4 by means of threaded bolts 9. A compression spring 19 bearing against end wall 7 of low-pressure casing 1 and against diaphragm plate 10 maintains movable wall 2 resiliently in the illustrated initial position.

Control valve housing 17, being made of plastics in the case of illustrated embodiment, includes a radially outwardly extending flange 20 at its end close to working chamber 3, which flange is engaged from behind by a sleeve 21 extending from control valve housing 17 to the low-pressure chamber side of movable wall 2 and having an outwardly angled collar 22, at its end close to the low-pressure chamber 4. The collar 22 is provided with a pair of first radially, outwardly angled collar portions 37 which engage the inner rims of the radial ribs 23, constructed as flat tongues, from behind, ribs 23 being located in a common plane at the bottom of a cup-like, substantially cylindrical hub member 24 of diaphragm plate 10. Ribs 23, hub member 24 and diaphragm plate 10 are integrally made of sheet metal.

Figure 2:
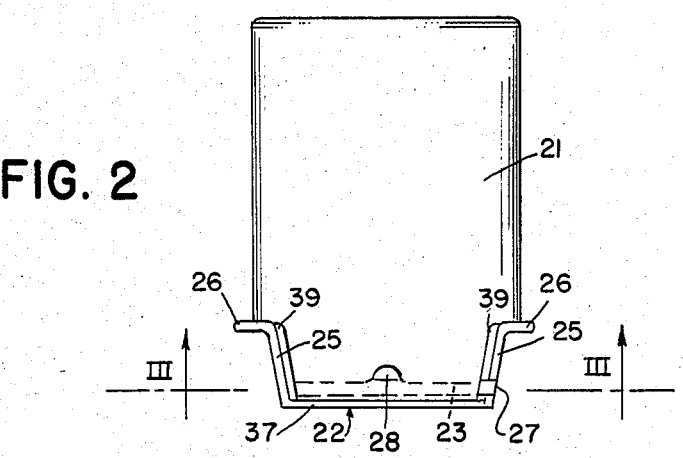
FIG. 2 is a side view of the sleeve connected to the control valve housing in the brake booster of FIG. 1.

Adjacent to both sides of each of the first collar portions 37 of the collar of sleeve 21 is one angled lateral collar portion 25 (FIG. 2) extending toward working chamber 3 and passing over into a second equally radially outwardly angled collar portion 26 located at an axially set-back sleeve rim 39 which is disposed between the two first collar portions 37. The second outwardly radially angled collar portions 26 interconnect the angled lateral collar portions 25. Spaced a small distance from collar portion 22, a lateral insertion slot 27 is provided in the two angled lateral collar portions 25. The circumferential distance of the adjoining angled lateral collar portions 25 is chosen so as to permit the two radial ribs 23 first to be moved axially between the adjacent angled lateral collar portions 25 when being assembled and to permit them by turning to 90° to be urged through the insertion slots 27 up to the position indicated by dot-dash lines in FIGS. 2 and 3. In this position, the ribs 23 are held by outwardly deformed indentations 28 (so-called lancing) abutting the rim of ribs 23 with one cutting edge.

Radial ribs 23 extend through two longitudinal slots 29 of reinforcement tube 5 constructed as wide slots. In the initial position shown in FIG. 1, the distance a between rolling diaphragm 13 and the end of longitudinal slots 29 close to working chamber 3 is chosen such that it is at least equal to half the power stroke of axially movable wall 2. Therefore, rolling diaphragm 13 does not extend over longitudinal slots 29, not even at the end of the power stroke.

Figure 3:
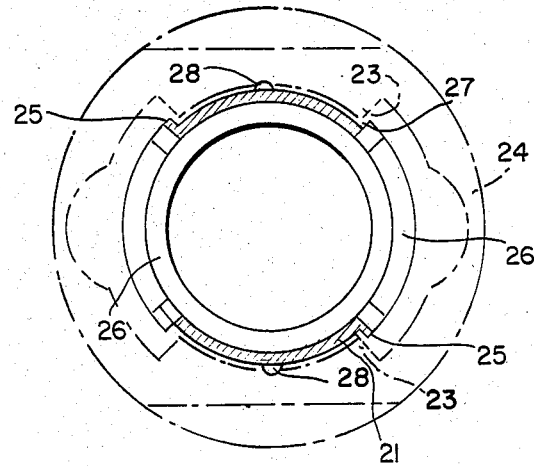
FIG. 3 is a cross sectional view taken along the line III—III of FIG. 2.

Inserted in hub member 24 in the area of inner rolling diaphragm 13 is a substantially cylindrical inset 30 made of plastics which is rounded off outwardly at its end close to working chamber 3 and forms a supporting surface for rolling diaphragm 13. The first radially outwardly angled collar portion 37 and radial ribs and tongues are wide as previously mentioned and the latter extend through wide longitudinal slots 29, also as previously mentioned. This substantial width of the radial ribs 23 is shown in FIG. 3 where each of these radial ribs 23 is shown extending over approximately one-quarter of the perimeter of the sleeve 21 and the substantial width of these longitudinal slots 24 is shown in FIG. 1. It will be seen that the substantial widths distribute substantial bending stresses transmitted thereto by the master cylinder during the boosting operation of the brake booster as previously mentioned.

When assembling the brake booster, diaphragm plate 10 is first of all fitted to reinforcement tube 5 with ribs 23 being inserted in longitudinal slots 29 from the low-pressure-chamber side. The preassembled control valve 15 with sleeve 21 fastened thereto will then be inserted in reinforcement tube 5. Sleeve 21 will be turned by 90° until ribs 23 are caught in a bayonet-like manner by the collar portions 22. The bayonet connection will subsequently be secured by forming indentations 28 or depressions at sleeve 21.

The outlines of hub member 24 and radial ribs 23 are indicated by dot-dash lines in FIG. 3.

Figure 4:
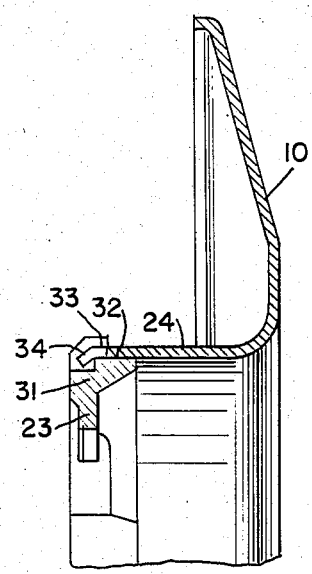
FIG. 4 is a partial longitudinal cross sectional view of a two-piece version of a diaphragm plate with a spacer ring.

In the embodiment shown in FIG. 4, hub member 24 of diaphragm plate 10 is connected to a spacer ring 31, at the inner rim of which radial ribs 23 are formed. Diaphragm plate 10 as well as hub member 24 are made of sheet metal. An end rim 32 of hub member 24 bears axially against a shoulder 33 of spacer ring 31. Bent-off holding tongues 34 engage in recesses of spacer ring 31 and secure ring 31 to hub member 24.

While we have described above the principles of our invention in connection with specific apparatus it is to be clearly understood that this description is made only by way of example and not as a limitation to the scope of our invention as set forth in the objects thereof and in the accompanying claims.

We claim:

1. An improved vehicle brake booster of the type having a casing that is divided into two chambers, a low-pressure chamber and a working chamber, the chambers being divided from each other in a sealed manner by an axially movable wall, the improvement comprising:

a reinforcement tube axially extending through said booster casing and fastened to the end walls of said casing, said reinforcement tube having a plurality of longitudinal slots of substantial width disposed in its periphery;

a rolling diaphragm forming a fold and disposed in a sealed relationship with said movable wall and said reinforcement tube;

a mechanically actuatable control valve for connecting said working chamber to a selected one of said low-pressure chamber or the atmosphere including a housing disposed generally coaxially in and axially movable within said reinforcement tube;

a longitudinal sheet metal sleeve disposed generally coaxially and axially movable within said reinforcement tube, one end of said sleeve being connected to said control valve housing and the other end of said sleeve engaging a plurality of radial ribs of said movable wall, said ribs also being of substantial width and projecting through and slidable in said reinforcement tube longitudinal slots and said ribs further including flat tongues disposed in a common plane transverse to a longitudinal axis of said casing, said sleeve including a radially and outwardly angled collar at said other end of said sleeve of substantial width, said collar engaging at least one acutely angled flat tongue of said movable wall radial rib on a side of said rib adjacent said low-pressure chamber to hold the ribs against the sleeve to prevent relative axial movement, said substantial width of said collar and said radial ribs distributing substantial bending stresses transmitted thereto during operation of the brake booster; and the distance between the fold of said rolling diaphragm and the adjacent end of said reinforcement tube longitudinal slots is at least equal to one-half the power stroke of said movable wall.

2. An improved brake booster according to claim 1, wherein said movable wall further includes a diaphragm plate, and said tongues are integrally formed with said diaphragm plate.

3. An improved brake booster according to claim 1, further including a plurality of indentations formed in said sleeve to abut the internal rims of said tongues on a side thereof adjacent said working chamber.

4. An improved brake booster according to claim 1, wherein said outwardly angled collar includes a pair of first radially outwardly angled collar portions, each of said first collar portions having a circumferential width corresponding to the circumferential width of one of said tongues and further including a pair of angled lateral collar portions connected to said first collar portions and extending toward said working chamber, said lateral collar portions being disposed between said pair of first collar portions.

5. An improved brake booster according to claim 4, wherein said longitudinal sleeve includes a rim axially spaced from said one end of said sleeve and disposed between said first collar portions, said rim including second radially outwardly angled collar portions, said second radially outwardly angled collar portions interconnecting said pair of angled lateral collar portions.

6. An improved brake booster according to claims 4 or 5, wherein a lateral insertion slot is provided in each of said pair of angled lateral collar portions, said slot being spaced axially from said first collar portions, the circumferential width between said pair of angled lateral collar portions being greater than the circumferential width of said tongues.

7. An improved brake booster according to claim 1, wherein said movable wall includes a diaphragm plate and a hub member extending axially from said diaphragm plate into said low-pressure chamber, and said tongues extend radially inwardly from an end of said hub member remote from said diaphragm plate, and further including a substantially cylindrical insert disposed between the inner surface of said hub member and the outer surface of said rolling diaphragm.

* * * * *